(12) United States Patent
Chen et al.

(10) Patent No.: US 11,599,797 B2
(45) Date of Patent: Mar. 7, 2023

(54) OPTIMIZATION OF NEURAL NETWORK IN EQUIVALENT CLASS SPACE

(71) Applicant: Microsoft Technology Licensing, LLC, Redmond, WA (US)

(72) Inventors: Wei Chen, Redmond, WA (US); Qiwei Ye, Redmond, WA (US); Tie-Yan Liu, Bejing (CN); Qi Meng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 16/771,609

(22) PCT Filed: Dec. 28, 2018

(86) PCT No.: PCT/US2018/067779
§ 371 (c)(1),
(2) Date: Jun. 10, 2020

(87) PCT Pub. No.: WO2019/135980
PCT Pub. Date: Nov. 7, 2019

(65) Prior Publication Data
US 2020/0302303 A1    Sep. 24, 2020

(30) Foreign Application Priority Data
Jan. 5, 2018  (CN) .......................... 201810012490.5

(51) Int. Cl.
*G06N 3/08*      (2006.01)
*G06N 3/084*    (2023.01)
*G06N 3/04*      (2023.01)

(52) U.S. Cl.
CPC .......... *G06N 3/084* (2013.01); *G06N 3/0481* (2013.01)

(58) Field of Classification Search
CPC ..... G06N 3/084; G06N 3/0481; G06N 3/0454
See application file for complete search history.

(56) References Cited

U.S. PATENT DOCUMENTS

| 9,633,306 B2 | 4/2017 | Liu et al. |
| 2003/0126517 A1* | 7/2003 | Givoni ................ G06F 11/3688 |
| | | 714/E11.208 |

(Continued)

OTHER PUBLICATIONS

Behnam Neyshabur et al, "Path-SGD: Path-Normalized Optimization in Deep Neural Networks," Arxiv.org, Cornell University Library , 201 Olin Library, Jun. 8, 2015, XP080795337 (Year: 2015).*

(Continued)

*Primary Examiner* — Jamal Javaid
(74) *Attorney, Agent, or Firm* — Schwegman Lundberg & Woessner, P.A.

(57) ABSTRACT

In implementations of the present disclosure, a solution for optimization of a learning network in an equivalent class space is provided. In this solution, base paths running through layers of a learning network are determined. Each node utilizes an activation function with a scaling invariant property to process an input from a node of a previous layer, each base path comprises a single node in each layer, and processing in the base paths is linearly independent from each other. A combined value of parameters associated with nodes in each base path is updated. A parameter associated with a node is used to adjust an input obtained from a node of a previous layer. Values of parameters associated with nodes in the base paths are updated based on updated combined values of parameters. Through this solution, optimization efficiency can be improved and more accurate optimized values of parameters are achieved.

15 Claims, 4 Drawing Sheets

(56) References Cited

U.S. PATENT DOCUMENTS

2015/0161988 A1    6/2015    Goel et al.
2017/0032246 A1    2/2017    Knittel et al.

OTHER PUBLICATIONS

Amari, Shun-Ichi, "Natural Gradient Works Efficiently in Learning", In Journal of Neural Computation, vol. 10, Issue 2, Feb. 15, 1998, pp. 251-276.
Ba, et al., "Layer Normalization", In Repository of arXiv:1607.06450, Jul. 21, 2016, pp. 1-14.
Badrinarayanan, et al., "Symmetry-Invariant Optimization in Deep Networks", In Repository of arXiv:1511.01754v1, Nov. 5, 2015, pp. 1-10.
Choromanska, et al., "The Loss Surfaces of Multilayer Networks", In Proceedings of the Eighteenth International Conference on Artificial Intelligence and Statistics, vol. 38, May 9, 2015, pp. 192-204.
Dauphin, et al., "Identifying and Attacking the Saddle Point Problem in High-Dimensional Non-Convex Optimization", In Proceedings of Annual Conference on Neural Information Processing Systems, Decembers, 2014, pp. 1-9.
Dinh, et al., "Sharp Minima Can Generalize for Deep Nets", In In Proceedings of 34th International Conference on Machine Learning, Aug. 6, 2017, 10 Pages.
Jin, et al., "How to Escape Saddle Points Efficiently", In Repository of arxiv:1703.00887v1, Mar. 2, 2017, pp. 1-35.
Kawaguchi, Kenji, "Deep Learning Without Poor Local Minima", In Proceedings of 30th Conference on Neural Information Processing Systems, Dec. 5, 2016, pp. 1-9.
Keskar, et al., "On Large-Batch Training for Deep Learning: Generalization Gap and Sharp Minima", In Repository of arXiv:1609.04836v1, Sep. 15, 2016, pp. 1-16.
Li, et al., "DeepGraph: Graph Structure Predicts Egonet Growth", Retrieved From: http://ls3.rnet.ryerson.ca/MAISoN/2017/Papers/9.pdf, Retrieved on: Nov. 23, 2017, 8 Pages.

Ioffe, et al., "Batch Normalization: Accelerating Deep Network Training by Reducing Internal Covariate Shift", In Proceedings of the 32nd International Conference on Machine Learning, vol. 37, Jul. 6, 2015, 9 pages.
Lu, et al., "Learning Compact Recurrent Neural Networks", In Proceedings of IEEE International Conference on Acoustics, Speech and Signal Processing, Mar. 20, 2016, pp. 5960-5964.
Meng, et al., "Optimizing Neural Networks in the Equivalent Class Space", In Repository of arXiv:1802.03713v1, Feb. 11, 2018, 18 Pages.
Neyshabur, et al., "Path-SGD: Path-Normalized Optimization in Deep Neural Networks", In Repository of arXiv:1506.02617v1, Jun. 8, 2015, 12 Pages.
Neyshabur, et al., "Path-SGD: Path-Normalized Optimization in Deep Neural Networks", In Proceedings of Annual Conference on Neural Information Processing Systems, Dec. 7, 2015, 9 Pages.
Nocedal, et al., "Numerical Optimization", Published by Springer Science, 1999, 651 Pages.
"International Search Report & Written Opinion issued in PCT Application No. PCT/US18/067779", dated Apr. 5, 2019, 13 Pages.
Salimans, et al., "Weight Normalization: A Simple Reparameterization to Accelerate Training of Deep Neural Networks", In Proceedings of 30th Conference on Neural Information Processing Systems, Dec. 5, 2016, pp. 1-9.
Tuv, et al., "Feature Selection with Ensembles, Artificial Variables, and Redundancy Elimination", In Journal of Machine Learning Research, vol. 10, Jul. 2009, pp. 1341-1366.
Ulyanov, et al., "Improved Texture Networks: Maximizing Quality and Diversity in Feed-forward Stylization and Texture Synthesis", In Proceedings of IEEE Conference on Computer Vision and Pattern Recognition, Jul. 21, 2017, pp. 4105-4113.
Worrall, et al., "Harmonic Networks: Deep Translation and Rotation Equivariance", In Proceedings of IEEE Conference on Computer Vision and Pattern Recognition, Jul. 21, 2017, pp. 7168-7177.
Zhou, et al., "Characterization of Gradient Dominance and Regularity Conditions for Neural Networks", In Repository of arxiv:1710.06910, Oct. 18, 2017, 19 Pages.
"Office Action Issued in Indian Patent Application No. 202017028001", dated Mar. 30, 2022, 8 Pages.

\* cited by examiner

OPTIMIZATION OF NEURAL NETWORK IN EQUIVALENT CLASS SPACE

CROSS-REFERENCE TO RELATED APPLICATION

This application is a U.S. National Stage Filing under 35 U.S.C. 371 of International Patent Application Serial No. PCT/US2018/067779, filed Dec. 28, 2018, and published as WO 2019/135980 A1 on Jul. 11, 2019, which claims priority to Chinese Application No. 201810012490.5 on Jan. 5, 2018; which applications and publication are incorporated herein by reference in their entirety.

BACKGROUND

Deep learning has a wide range of applications in many fields such as image classification, machine translation, speech recognition and so on. For example, on the basis of big data and powerful computing resources, it is possible to train deep neural networks (DNN) with multiple layers and multiple parameters, which are also referred to as deep learning networks. During the training or optimization phase, parameters of a learning network are needed to be trained and optimized based on a given training dataset and an optimization target. For instance, for the training of a neural network, it is possible to use a stochastic gradient descent (SGD) method. However, training of the learning network is generally a very tough task and requires a large number of iteration processes to update various parameters of the learning network. The determination of the parameters depends on convergence of the iteration process. This will consume a great amount of computing and time resources.

SUMMARY

In accordance with implementations of the subject matter described herein, there is provided an optimization scheme for learning networks in equivalent class space. In this solution, a plurality of base paths running through a plurality of layers of a learning network are determined. Each node in the layers utilizes an activation function with a scaling invariant property to process an input from a node of a previous layer, and each base path includes a node in each of the plurality of layers, and processing in the plurality of base paths is linearly independent from each other. For each of the base paths, a combined value of parameters associated with the nodes in the base path is updated. A parameter associated with a node in each base path is for adjusting the input obtained by the node from a node of a previous layer. Based on the updated combined values of parameters, values of the parameters associated with the nodes on the layers in the plurality of base paths are updated. Through this solution, optimization of a learning network is performed in an equivalent class space represented by the base paths, which can improve computing efficiency of the optimization and makes it possible to obtain the optimized values of parameters more quickly and accurately.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "include" and its variants are to be read as open terms that mean "includes but is not limited to." The term "based on" is to be read as "based at least in part on." The terms "one implementation" and "an implementation" are to be read as "at least an implementation." The term "another implementation" is to be read as "at least one other implementation." The terms "first," "second," and the like may refer to different or same objects. Other definitions, either explicit or implicit, may be included below.

EXAMPLE ENVIRONMENT

Figure 1:
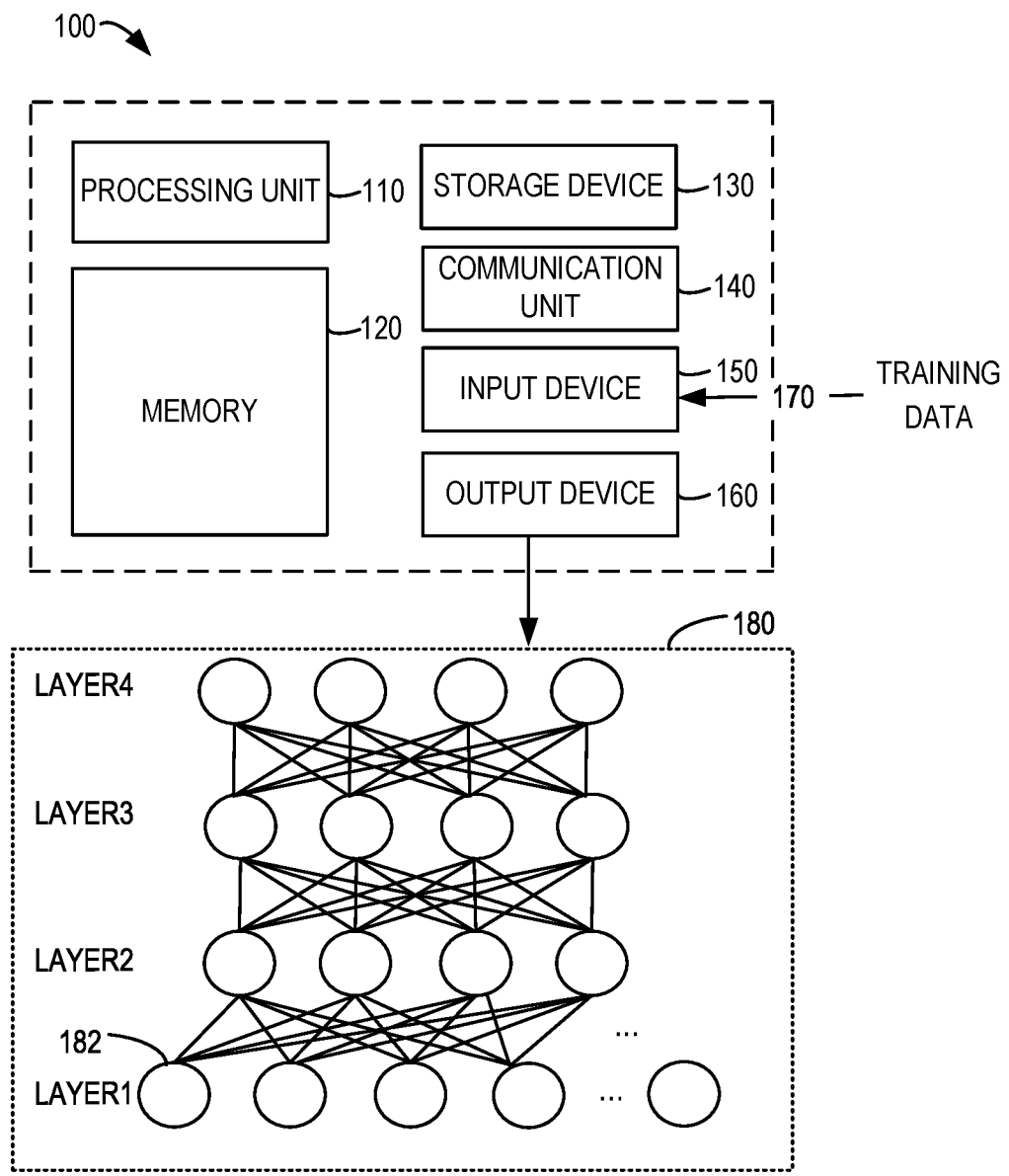
FIG. 1 illustrates a block diagram of a computing device capable of implementing implementations of the subject matter described herein.

FIG. 1 illustrates a block diagram of a computing device 100 in which various implementations of the subject matter described herein can be implemented. It would be appreciated that the computing device 100 as shown in FIG. 1 is only provided as an example and should not considered as any limitations on the functions and scope of the implementations described herein. As shown in FIG. 1, the computing device 100 includes a computing device 100 in form of a general-purpose computing device. Components of the computing device 100 may include, but are not limited to, one or more processors or processing units 110, a memory 120, a storage device 130, one or more communication units 140, one or more input devices 150 and one or more output devices 160.

In some implementations, the computing device 100 may be implemented as various user terminals or service terminals having computing capability. The service terminals may be servers, large-scale computing devices and the like provided by various service providers. The user terminals are, for instance, any type of mobile terminal, fixed terminal or portable terminal, including mobile phones, stations, units, devices, multimedia computers, multimedia tablets, Internet nodes, communicators, desktop computers, laptop computers, notebook computers, netbook computers, tablet computers, personal communication system (PCS) devices, personal navigation devices, personal digital assistants (PDA), audio/video players, digital cameras/video players, positioning devices, television receivers, radio broadcast receivers, electronic book devices, gaming devices or any combination thereof, including the accessories and peripherals of these devices, or any combination thereof. It may be further predicted that the computing device 100 can support any type of interface for the user (such as "wearable" circuitry, etc.).

The processing unit 110 may be a physical or virtual processor and can implement various processes based on programs stored in the memory 120. In a multi-processor system, multiple processing units execute computer executable instructions in parallel to improve the parallel processing capability of the computing device 100. The processing unit 110 may be also referred to as a central processing unit (CPU), a microprocessor, a controller, or a microcontroller.

The computing device 100 typically includes various computer storage media, which can be any available media accessible by the computing device 100, including but not limited to volatile and non-volatile media, and removable and non-removable media. The memory 120 can be a volatile memory (for example, register, high-rate cache, random access memory (RAM)), non-volatile memory (for example, read-only memory (ROM), electrically erasable programmable read-only memory (EEPROM), flash memory), or any combination thereof. The memory 120 may include program modules configured to perform functions of various implementations described herein.

The storage device 130 may be removable and non-removable media and may include machine readable media which can be used to store information and/or data and are accessible in the computing device 100. The computing device 100 may further include other removable/non-removable and volatile/non-volatile storage media. Although not shown in FIG. 1, it is possible to provide disk drive for reading from and writing into removable and non-volatile disks and disc drive for reading from and writing into removable and non-volatile discs. In such cases, each drive may be connected to the bus (not shown) via one or more data medium interfaces.

The communication unit 140 communicates with a further computing device via communication media. Additionally, functions of components of the computing device 100 may be implemented by a single computing cluster or multiple computing machines which are communicatively connectable for communication. Therefore, the computing device 100 may be operated in a networked environment over a logical link with one or more other servers, personal computers (PCs) or a further general network node.

The input device 150 may include one or more input devices, such as a mouse, keyboard, touch screen, tracking ball, voice-input device and the like. The output device 160 may be one or more output devices, such as a display, loudspeaker, printer and the like. The computing device 100 may also communicate with one or more external devices (not shown) via the communication unit 140 as required. The external devices, such as the storage devices and display devices, communicate with one or more devices that enable the user to interact with the computing device 100, or any device (such as a network card, modem, and the like) that enables the computing device 100 to communicate with one or more other computing devices. Such communication may be performed via an input/output (I/O) interface (not shown).

In some implementations, in addition to being integrated on a single device, some or all of the components of the computing device 100 may be configured in form of a cloud computing architecture in which these components may be configured remotely and work together to implement the functions discussed in the subject matter described herein. In some implementations, cloud computing provides computing, software, data access and storage services which do not require the terminal user to know the physical position or configuration of the system or hardware providing these services. In various implementations, cloud computing follows suitable protocols to provide service via a Wide Area Network (such as Internet). For example, cloud computing providers provide applications via the Wide Area Network, which can be accessed via a web browser or any other computing components. The software or components of the cloud computing architecture and the associated data may be stored in a server at a remote location. The computing resources in the cloud computing environment may be aggregated or distributed at a central position of the remote data. The cloud computing infrastructure may provide services via a shared data center, even if they appear as a single access point for the user. Therefore, it is possible to use the cloud computing architecture to provide components and functions described herein from a service provider at the remote location. Alternatively, they can be provided from a conventional server or be installed on a client device directly or in other manners.

The computing device 100 may be used to perform optimization of a learning network in implementations of the subject matter described herein. The optimization of the learning network is also referred to as training of the learning network. The optimized parameter values can be obtained by updating parameters of the learning network constantly. In implementations of the subject matter described herein, the learning network may also be referred to as "neural network" or "learning model." The terms "learning model," "learning network," "neural network," "model" and "network" may be used interchangeably hereinafter. The learning network may be designed for different applications, including object classification (such as image classification, action recognition and so on), machine translation, voice recognition and other fields. To describe the subject matter described herein more clearly, reference will be made to a learning network based on multi-class learning. However, it is to be understood that the concepts of the subject matter described herein may also be applicable for optimization of various suitable learning networks.

The training of the learning network is based on training data 170. The computing device 100 may receive the training data 170 through the input device 150. The training data 170 includes possible input data of the learning network and ground-truth output for the input data so that the trained learning network is able to predict the output corresponding to the input data of the same type. For example, in the training of the learning network designed for image classification, the training data 170 may include training images and a classification label for each training image. The computing device 100 may also output the optimized learning network 180 via the output device 160, for instance, to other computing devices. Parameters in the optimized learning network 180 have been determined. In other implementations, the computing device 100 may also store the optimized learning network 180 in the memory 120 for use locally.

FIG. 1 further shows an illustrative structure of the learning network 180. The learning network 180 has a layered structure, including a plurality of layers each having a plurality of nodes. Each node performs a linear combination and non-linear activation on input from nodes of the previous layer. The input of each node is further adjusted by parameters to achieve a linear combination of the input from the previous layer (such as linear weighting). In the subject matter described herein, a parameter for adjusting an input of each node is referred to as a parameter associated with the node.

In the example illustrated in FIG. 1, the learning network 180 is used to solve a multi-class problem. The learning network 180 includes a plurality of layers, such as layer1 to layer4, each including a plurality of nodes 182. In plurality of layers, the first layer (layer1) is an input layer and each node corresponds to an input $(x_1, x_2, \ldots, x_d)$ of the learning network 180. To provide a classification result, the last layer (i.e, layer4) of the learning network 180 is a Softmax layer. The nodes at the Softmax layer use a Softmax activation function to perform a Softmax operation to the inputs of this layer and the outputs $(y_1, y_2, \ldots y_k)$ indicate probabilities for the inputs being divided into different classes. The Softmax operation is commonly known in the art as a well-known operation widely applied for the multi-class learning problem, thus it will not be repeated here. $x \in \mathbb{R}^d$ and $y \in \mathbb{R}^K$ may be used to represent the input space and the output space of the learning network 180, where $\mathbb{R}$ represents a set of real numbers and d represents the dimension of the input space, and K represents the number of classes in the output space. The layer prior to the Softmax layer (i.e., layer3) may be referred to as the output layer of the learning network. The learning network 180 may further include one or more layers between the input layer and the output layer, which is (are) sometimes referred to as hidden layer(s). In some implementations, the plurality of layers of the learning network 180 include a fully-connected layer, which means that all the nodes on one layer are connected to each of the nodes at the next layer.

Nodes on the respective layers of the learning network 180 may be interconnected so that the outputs of the previous layer serve as inputs of the following layer. Parameters associated with a node are used to adjust inputs of the node. For example, in the illustrative structure of the learning network 180, for layer2, inputs from a plurality of nodes on layer1 is adjusted by an associated parameter set W; for layer3, inputs from a plurality of nodes on layer2 is adjusted by an associated parameter set V; for layer4, inputs from a plurality of nodes on layer3 is adjusted by an associated parameter set U. Except for the input layer1, nodes on the other layers of the learning network process inputs of the nodes with an activation function.

The computing device 100 may determine each parameter associated with the nodes through a training or optimization process such that the trained learning network 180 can be capable of the corresponding functions. During the training process of the learning network, a loss function may be determined as an optimization target so as to achieve convergence of the training by minimizing the loss function. Alternatively, it is also possible to train the model by maximizing a utility function which generally has a form of its equivalent loss function, for example, it may be represented by an inverse of the loss function. Therefore, for purpose of brevity, implementations of the subject matter described herein will be illustrated substantially in combination with loss function.

It is to be understood that the structure of the learning network 180 described in FIG. 1 is only an illustrative example. In other implementations, the learning network 180 may be constructed to contain more or fewer layers and each layer may include other number of nodes. The scope of the subject matter described herein is not limited in this regard.

REDUNDANCY OF PARAMETER SPACE

Training a learning network is a complicated task. In the conventional training, the outputs of the learning network are represented as being associated with each parameter of the entire learning network. Through some training methods, such as a stochastic gradient descent, each parameter can be updated to seek for an optimal value of the parameter. It has been proven that such a process consumes considerable computing resources and time, and parameters may stop at some spurious critical points, resulting in insufficient optimization. For instance, in the example of the learning network 180, if it is assumed that the number of nodes at each layer is $h_l$, $l \in [L]$ and each layer is a fully connected layer, the number of parameters at the l-th layer is $h_{l-1}h_l$ ($l>1$) or $dh_1(l=1)$, then the parameter space of the learning network 180 may be represented as $W \subset \mathbb{R}^{dh_1+h_1h_2+\ldots h_{L-1}h_L}$.

The inventors have been found that using all parameters of a learning network directly to represent the learning network is rather redundant in some cases, and may result in insufficient optimization of the parameters. Currently, many learning networks, especially deep neural networks (DNN), utilize an activation function with a scaling invariant property. In such learning networks, the parameter space has serious redundancy, specifically manifested in that learning networks trained to have different parameter sets possibly generate the same output for the same input. Such redundancy causes difficulties in parameter optimization during the training process.

Figure 2A:
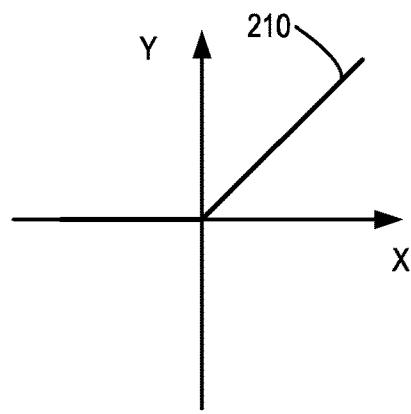
FIG. 2A illustrates a schematic diagram of a curve of an activation function with a scaling invariant property.
Figure 2B:
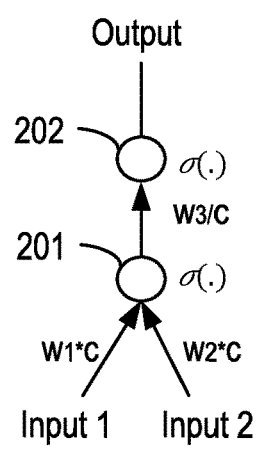
FIG. 2B illustrates a schematic diagram of processing between part of nodes of a learning network.

The redundancy caused by representing the learning network in the parameter space will be illustrated below and reference will be made to FIG. 2A and FIG. 2B to briefly describe an activation function with a scaling invariant property. The scaling invariant property of an activation function means that if an input of the activation function changes proportionally, then the output also changes proportionally, which can be represented as $\sigma(cx)=c\sigma(x)$, where $c>0$, and $\sigma(\cdot)$ represents an activation function. Among the activation functions that are usually used in the learning networks, activation functions with the scaling invariant property include a ReLU function and a piecewise linear function. In some implementations, it is also possible to select a linear function with multiple segments to approximate another activation function that is usually used in the learning network, i.e., Sigmoid function. Therefore, although the Sigmoid function does not have the scaling invariant property in a strict sense, it is possible to obtain the activation attribute and scaling invariable attribute of the Sigmoid function simultaneously by mans of a piecewise linear function. For purpose of depiction, in the subject matter described herein, the ReLU function is taken as an example for depiction. It is to be understood that the implementations described herein are also applicable to other activation functions with the scaling invariable attribute.

The ReLU function may be represented as $\sigma(x)=\max(x, 0)$. The scaling invariant property of the ReLU function is represented as $\sigma(cx)=\max(cx, 0)=c\max(x, 0)=c\sigma(x)$. FIG. 2A illustrates an illustrative curve 210 of such ReLU function, where $y=\sigma(x)$. Due to the scaling invariant property, if the ReLU function is used as an activation function of a node in the learning network, then a condition as illustrated in FIG. 2B may occur. FIG. 2B illustrates a schematic diagram of processing between two nodes 201 and 202 in a certain learning network. Parameters associated with the node 201 at the bottom layer include w1*c and w2*c and parameters associated with the node 202 at the upper layer include w3/c. The values of these parameters associated with the two nodes may be varied and all these values can produce the same output for any input (input 1 and input 2) of this part.

Generally, even if the structures of learning networks are the same, if the corresponding parameters are trained to have different values, these learning networks are generally considered to be different. Therefore, in the training of a learning network using an activation function with a scaling invariant property, it is possible to obtain different learning networks which are substantially equivalent because they always give the same output for the same input. It is assumed that two learning networks are represented as $N_{w_1}$ and $N_{w_2}$, respectively. If it is indicated in the subject matter described herein that $N_{w_1}$ and $N_{w_2}$ are equivalent, it means that for each given input $x \in X$, $N_{w_1}(x) = N_{w_2}(x)$. There may be a number of such equivalent learning networks. In addition, if $N_{g(w)}$ and $N_w$ are equivalent, it may be considered that the learning network $N_w$ is g-invariant. The g-invariant characteristic of the learning network means that for a given learning network, a variant g for the learning network might be found so that the output of the learning network remains constant.

DISCUSSION OF EQUIVALENT CLASS PRINCIPLE

Based on the above observations, the inventors have found that on the basis of the equivalence caused by the scaling invariant property of the activation function, it is possible to convert the representation of the learning network from the parameter space to a more efficient and compact equivalent class space. For example, in the conventional training process of a learning network, the loss function is represented as a function of all the parameters of the learning network, such as Loss (W), where Loss(·) represents the loss function and W represents a set of all parameters of the learning network. In accordance with the implementations of the subject matter described herein, it is proposed to perform optimization of the learning network on the basis of an equivalent class. Thus, the loss function may be represented as Loss (E), where E represents the equivalent class space of the learning network. To facilitate understanding of the principles of the subject matter described herein, before detailed discussion of implementations for optimizing the learning network of the subject matter described herein, it is described first the theoretical support for the possibility of optimizing the learning network based on the equivalent class.

The learning network of the subject matter described herein refers to the network in which each node of a plurality of layers utilizes an activation function with a scaling invariant property to process the input from node(s) of the previous layer. On the basis of the activation function with the scaling invariant property, it is possible to re-parameterize the learning network; in other words, a transition g might be found to make the learning network g-invariant.

First, concepts of equivalence and g-invariant are analyzed from the perspective of a single node. For a given hidden node (i.e., a node at a hidden layer) in the learning network, it is assumed that the parameter for adjusting the input of the node is $W_{O_{in}}$ and the parameter for adjusting the output of the node (i.e., an input of a node at the previous layer) is $W_{O_{out}}$ and a positive constant value c. The node can be defined as:

$$g_{c,O}([W_{O_{in}}, W_{O_{out}}]) = \left[ c \cdot W_{O_{in}}, \frac{1}{c} \cdot W_{O_{out}} \right] \quad (1)$$

Therefore, $g(w) = g_{c_N, O_N} \ldots g_{c_1, O_1}(w)$ can be defined to represent a function formed by a finite number of functions $g_{c_i, O_i}$, where all $c_i$ ($i \in [N]$) are positive, and $O_i$ ($i \in [N]$) represents hidden nodes of the learning network $N_w$.

To ensure that the learning network $N_w$ is g-invariant, it needs to simply prove that $N_w$ is $g_{c_1, O_1}$-invariant. Without loss of generality, assuming that $O_1$ is a hidden node at the l-th layer of the learning network $N_w$, and a ReLU activation function utilized by this node is represented as $\sigma_l(\cdot)$ while the activation function of the node at the previous (l−1)th layer is represented as $\sigma_{l-1}(\cdot)$. It can be determined directly that $\sigma_l^{O_1}((c_1 W_{O_{l,in}})^T \sigma_{l-1}) = c_1 \cdot \sigma_l^{O_1}(W_{O_{l,in}}^T \sigma_{l-1})$. It can be determined it can be further determined $$W_{O_1,out}^T \sigma_l^{O_1} = \frac{1}{c_1} W_{O_1,out}^T \cdot c_1 \sigma_l^{O_1},$$

which means that $N_w$ is g-invariant. Hence, the learning network $N_w$ is equivalent to the learning network $N_{g(w)}$.

All the g-invariant learning networks of the learning network $N_w$ form an equivalent class. On this basis, a more compact representation of the learning network $N_w$ can be obtained. For example, the output (represented as $O_L^j$) of a node at the last layer (such as layer L) prior to the Softmax layer of the learning network $N_w$ is calculated in the parameter space as:

$$O_L^j = \sum_{i_L=1}^{h_L} \sum_{i_{L-1}=1}^{h_{L-1}} \ldots \sum_{i_0=1}^{d} w_{ji_L}^L w_{i_L i_{L-1}}^{L-1} \ldots w_{i_1 i_0}^1 x_{i_0} \cdot a_{ji_L \ldots i_0}(x, W) \quad (2)$$

where j is valued from the node number from layer 1 to layer L; the function $a_{ji_L \ldots i_0}(x, W)$ refers to an indicator function, where if a path involving nodes $j \to i_L \to \ldots \to i_0$ in the learning network is active, then the function is equal to 1, and otherwise, the function is equal to 0. The loss function of the learning network $N_w$ may be represented by each node $O_L^j$ at layer L. It can be seen from the expression that $w_{ji_L}^L w_{i_L i_{L-1}}^{L-1} \ldots w_{i_1 i_0}^1$ and $a_{ji_L \ldots i_0}(\cdot, W)$ can be used to represent a unit component of the equivalent class. It is assumed that the path (represented as $p_{ji_L \ldots i_0}$) includes nodes involved by parameters in $w_{ji_L}^L w_{i_L i_{L-1}}^{L-1} \ldots w_{i_1 i_0}^1$. Through the following further depiction, it is to be understood that the path can be used to represent an equivalent class.

To enable the representation of an equivalent class by a path, g-invariant should meet the following sufficient and necessary condition: for a fixed x, all paths and $a_{ji_L \ldots i_0}(x, W)$ have a fixed value $O_L^j$. Specifically, if it is given that learning networks $N_w$ and $N_{\tilde{w}}$ are equivalent, and $\sigma(\cdot)$ represents processing of the ReLU activation function, then for each hidden node in the learning network $N_{\tilde{w}}$, $$\tilde{\sigma} = \sigma\left(\sum_{i=1}^{h_l} \tilde{w}_i \tilde{\sigma}_i\right) = \sigma\left(\sum_{i=1}^{h_l} c \cdot c_i w_i \cdot \frac{1}{c_i} \tilde{\sigma}_i\right) = c \cdot \sigma \quad (3)$$

Thus, the output $O_L^j$ of all the paths of the learning networks $N_w$ and $N_{\tilde{w}}$ will have a fixed value. In other words, g-variant will not change the value after each processing by applying the ReLU activation function.

It is given that for a fixed x, all the paths of the learning networks $N_w$ and $N_{\tilde{w}}$ and $a_{j_{i_L} \ldots i_0}(x, W)$ have a fixed value $O_L^j$. Thus, a function g(w) can be determined. It is assumed that the learning networks $N_w$ and $N_{\tilde{w}}$ have the same paths and same output values. For each hidden node (represented as $O_j^1$) between the first layer and the second layer of any learning network, it is possible to construct a function $g_{c_j}^1$, $O_j^1$, where $c_j^1 > 0$. If such a function cannot be constructed, then there may be paths with different output values. For example, it is assumed that parameters $w_1$ and $w_2$ for adjusting the input of the hidden node $O_j^1$ meets $\tilde{w}_1 = c_1 w_1$, $\tilde{w}_2 = c_1^j w_2$ and $c_1 \ne c_2$. It is further assumed that the path involving the parameter $w_1$ and other possible parameters is a path $p_1$, the path involving the parameter $w_2$ and other parameters similar to $p_1$ is a path $p_2$, the path involving parameter $\tilde{w}_1$ and other possible parameters is a path $\tilde{p}_1$ and the path involving parameter $\tilde{w}_2$ and other parameters similar to $\tilde{p}_1$ is a path $\tilde{p}_2$. It can be determined that if $p_1 = \tilde{p}_1$, then definitely $p_2 \ne \tilde{p}_2$. Therefore, it can be proven reversely that the function $g_{c_j}^1$, $O_j^1$ must be constructed, where $c_j^1 > 0$, and thus it can be determined $$\prod_{j=1}^{h_1} g_{c_j^1, O_j^1}^{-1}(N_{\tilde{w}}) = \prod_{j=1}^{h_1} g_{\frac{1}{c_j^1}, O_j^1}(N_{\tilde{w}}).$$

It has been discussed above that the function g(w) can be constructed for a single node. For each node in each path, it is possible to construct such a function layer by layer. Hence, learning networks $N_w$ and $N_{\tilde{w}}$ are g-invariant.

Figure 3:
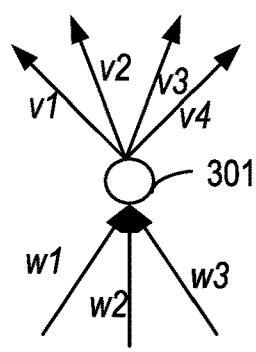
FIG. 3 illustrates a schematic diagram of processing of the input and output of a single node.

As mentioned above, the parameter space of the learning network may be represented as $W \subset \mathbb{R}^{dh_1 + h_1 h_2 + \cdots h_{L-1} h_L}$. To classify the parameter space into different equivalent classes based on equivalence of the learning networks, it should be determined how to use parameters to represent the equivalent class. The attribute of the equivalent class is first discussed from the perspective of a single hidden node. To facilitate understanding, reference is made to FIG. 3 for depiction. FIG. 3 illustrates a single node 301 which has parameters $w_1$, $w_2$ and $w_3$ for adjusting the input of the node 301. These parameters are used to adjust the input of the corresponding node from the previous layer. The output of the node 301 to each node at the next layer is adjusted by parameters $v_1$, $v_2$, $v_3$ and $v_4$.

In the example illustrated in FIG. 3, information of each equivalent class of the node 301 may include $w_1 v_1, \ldots w_1 v_4$, $w_2 v_1, \ldots, w_2 v_4, w_3 v_1, \ldots, w_3 v_4$ and signs of each parameter $w_1, w_2, w_3, v_1, v_2, v_3$ and $v_4$. Generally, it is possible to obtain only the sign of the parameter $w_1$ and determine signs of other parameters based on the sign of the parameter $w_1$. Sometimes, it is not necessary to obtain all of the $w_i v_j, i \in [3], j \in [4]$. For example, if it is given $w_1 v_j, j \in [4]$ and $w_2 v_1, w_3 v_1$, other $w_i v_j$ may be obtained through the following equation:

$$w_i v_j = \frac{w_1 v_j \cdot w_i v_1}{w_1 v_1} \quad (4)$$

It is assumed here that the value of each parameter is non-zero.

For each node, if it is assumed that the set of parameters for adjusting the input of the node is $W = [w_1, \ldots, w_m]$ and the set of parameters for adjusting the output from the node to other nodes at the next layer is $V = [v_1, \ldots, V_J]$, then the equivalent class of this node may be represented as:

$$E = \{w_1 v_j, w_i v_1, j \in \{1, \ldots, J\}, i \in \{2, \ldots, m\}, \text{sgn}(w_1)\} \quad (5)$$

For clearer illustration, Equation (5) may be divided as:

$$E^+ = \{w_1 v_j, w_i v_1, j \in \{1, \ldots, J\}, i \in \{2, \ldots, m\}, w_1 > 0\} \quad (6)$$

$$E^- = \{w_1 v_j, w_i v_1, j \in \{1, \ldots, J\}, i \in \{2, \ldots, n\}, w_1 < 0\} \quad (7)$$

Thus, for a single node, its equivalent class may be represented with the form of combination of parameters above. Similarly, it is also possible to expand the form of the above combination of parameters to the entire learning network.

The equivalent class of a single node may also be determined from the perspective of algebra. It is assumed that addition and multiplication of different values are represented as $a \oplus b = a \cdot b$ and $k \odot a = a^k$ (where k>0), respectively. On this basis, it is possible to create a mapping f(W,V) between the parameter set W for adjusting the input of the node 301 and the parameter set V for adjusting the output of the node 301, where $W \in \mathbb{R}_+^m$ and $V \in \mathbb{R}_+^J$. The mapping f(W,V) can be represented as:

$$f([W, V]) = [w_1, \ldots, w_m, v_1, \ldots, v_J] A^T \quad (8)$$
$$= [w_1 v_1, w_1 v_2, \ldots, w_1 v_J, \ldots, w_m v_1, \ldots, w_m v_J]$$

where A represents the following matrix:

$$A = \begin{bmatrix} \overbrace{1, 0, \ldots, 0}^{m}, \overbrace{1, 0, \ldots, 0}^{J} \\ 1, 0, \ldots, 0, 0, 1, \ldots, 0 \\ \ldots \\ 1, 0, \ldots, 0, 0, 0, \ldots, 1 \\ \ldots \\ \ldots \\ 0, 0, \ldots, 1, 1, 0, \ldots, 0 \\ \ldots \\ 0, 0, \ldots, 1, 0, 0, \ldots, 1 \end{bmatrix} \begin{matrix} \} J \\ \\ \} (m-2)J \\ \\ \} J \end{matrix} \quad (9)$$

It can be determined that the mapping f(W, V) is a linear mapping for $a \oplus b = a \cdot b$ and $k \odot a = a^k$. In particular, for each [W, V], [$\tilde{W}$, $\tilde{V}$] and $k_1, k_2 > 0$, it may be determined:

$$f(k_1 \odot [W, V] \oplus k_2 \odot [\tilde{W}, \tilde{V}]) = \left[w_1^{k_1} \tilde{w}_1^{k_2}, \ldots, w_m^{k_1} \tilde{w}_m^{k_2}, v_1^{k_1} \tilde{v}_1^{k_2}, \ldots, v_J^{k_1} \tilde{v}_J^{k_2}\right] A^T \quad (10)$$
$$= \left[w_1^{k_1} \tilde{w}_1^{k_2} v_1^{k_1} \tilde{v}_1^{k_2}, \ldots, w_m^{k_1} \tilde{w}_m^{k_2} v_J^{k_1} \tilde{v}_J^{k_2}\right]$$
$$= \left[w_1^{k_1}, \ldots, w_m^{k_1}, v_1^{k_1}, \ldots, v_J^{k_1}\right] A \oplus$$
$$\left[\tilde{w}_1^{k_2}, \ldots, \tilde{w}_m^{k_2}, \tilde{v}_1^{k_2}, \ldots, \tilde{v}_J^{k_2}\right] A^T$$
$$= k_1 \odot f([W, V]) \oplus k_2 \odot f([\tilde{W}, \tilde{V}]).$$

where $A^T$ is a matrix for the linear mapping f. After being calculated, it can be determined rank(A)=m+J−1. If ker(f)={[W,V], f([W,$\tilde{V}$])=1} represents the kernel space of f and Im(f)={f([W,V]), $W \in \mathbb{R}_+^m$, $V \in \mathbb{R}_+^n$} represents the image space of f, both ker(f) and Im(f) are linear spaces, and rank(ker(f))=1. On the basis of: rank(A)=m+J−1, it may be determined that the basis for Im(f) is $\{w_1v_j, \ldots, w_i, j \in \{1, \ldots, J\}, i \in \{2, \ldots, m\}\}$.

As not every parameter in parameter sets W and V is always positive, it may need to generalize the above linear mapping f as:

$$\tilde{f}(W,V) = [|w_1|, \ldots, |w_m|, |v_1|, \ldots, |v_J|]\tilde{I}A^T \quad (11)$$

where $\tilde{I}=\text{diag}\{\text{sgn}(w_1), \ldots, \text{sgn}(w_m), \text{sgn}(v_1), \text{sgn}(v_J)\}$. On this basis, the basis for Im(f) may be updated as:

$$E = \{w_1v_j, \ldots, w_iv_1, j \in \{1, \ldots, J\}, i \in \{2, \ldots, m\}, \text{sgn}(w_1)\} \quad (12)$$

The Equation (12) may be used to represent the equivalent class of a single node.

On the basis of the equivalent class of a single node, it is possible to determine the condition of the learning network belonging to the equivalent class, that is, for all the learning networks $N_{W,V}(x)$, if $[W,V] \in E$, these learning networks are equivalent. Specifically, if $E=\{w_1, v_j, \ldots, w_iv_1, j \in \{1, \ldots, J\}, i \in \{1, \ldots, m\}, \text{sgn}(w_1)\}$, the sign for each parameter may be determined and the value $w_iv_j$ of the path of the learning network may be determined on the basis of Equation (4). For each $[W,V] \in E$ and $[\tilde{W},\tilde{V}] \in E$, there is a variant $g_c$ that makes $[W,V] = g_c([\tilde{W},\tilde{V}])$, where $$c = \frac{w_1}{\tilde{w}_1}.$$

Thus, the learning network $N_{W,V}(x)$ is g-invariant. Therefore, these learning networks are equivalent. Furthermore, it can be proved that if two classes $E_1$ and $E_2$ are different, then $E_1 \cap E_2 = \theta$. Particularly, if two different equivalent classes $E_1$ and $E_2$ contain [W,V], based on Equation (12), it may be determined that $E_1$ and $E_2$ are equal.

On the basis of the representation of the equivalent class of a single node, it is possible to represent the equivalent class of each path of the learning network. It is assumed that $W_l \in \mathbb{R}_+^{h_{l-1}h_l}$, $\forall l \in L$ represents a parameter set for adjusting the input from the (l−1)th layer of the learning network to the l-th layer of the learning network, for the entire learning network, a similar linear mapping can be constructed as:

$$f(W_1, \ldots, W_L) = [W_1, \ldots, W_L]A \quad (13)$$

$$= \left[ w_{x^j \to o_1^{j_1}} w_{o_1^{j_1} \to o_2^{j_2}}, \cdots w_{o_L^{j_L} \to o^{j_{L+1}}}, \right.$$

$$\forall j \in [d], j_1 \in [h_1], \ldots, j_L \in [h_L],$$

$$\left. = j_{L+1} \in [d]_1 \right]$$

where $d_1$ is the number of nodes at the output layer of the learning network, and each $^wx_j \to O_1^{j_1\ w}O_1^{j_1} \to O_2^{j_2} \ldots \ ^wO_{L-1}^{j_{L-1}} \to O_L^{j_L}$ represents a path of nodes associated with the parameter therein. Similar to a single node, the basis for rank(A)) and Im(f) in the linear mapping in Equation (13) may also be determined. It is also possible to calculate $\text{rank}(A) = dh_1 + h_1h_2 + \ldots + h_{L-1}h_L + h_Ld_1 - h_1 - \ldots - h_L$.

Further, it may be further determined $\text{rank}(\text{ker}(f)) = h_1 + h_2 + \ldots + h_L$, $\text{rank}(\text{Im}(f)) = dh_1 + h_1h_2 + \ldots + h_{L-1}h_L - h_1 - \ldots - h_L$. If $r_1 = \text{rank}(\text{ker}(f))$ and $r_2 = \text{rank}(\text{Im}(f))$, it may be determined that the basis for ker(f) is $b_{ker} = [w_{i_1}, \ldots, w_{i_{r_1}}]$ and $\text{Im}(f): b_{Im} = [f_1, \ldots, f_{r_2}]$.

Based on the extension from the node to the layer of the learning network, it may be determined that a representation of an equivalent class of a learning network is:

$$E = \{p_1, \ldots, p_{r_2}, \text{sgn}(w_{i_1}), \ldots, \text{sgn}(w_{i_{r_1}})\} \quad (14)$$

where each $p_i$ represents a path which is located on the basis of Im(f). On the basis of the equivalent class of the layers of the learning network, the condition of the learning network being the equivalent class may be determined as the following: for all the learning networks $N_{W,V}(x)$, if $[W_1, \ldots, W_L] \in E$, then these learning networks are equivalent. In addition, it may also be determined that if two equivalent classes $E_1$ and $E_2$ of the learning networks are different, then $E_1 \cap E_2 = \theta$.

OPTIMIZATION BASED ON EQUIVALENT CLASS

Based on the above discussion of principles, the inventors have found that the learning network may be represented by processing paths (referred to as "base paths" herein) that are linearly independent in the learning network. Representing the learning network with the base paths is corresponding to representing the learning network in an equivalent class space based on a plurality of layers in the learning network, which makes the representation of the learning network more compact with lower redundancy. On the basis of such observations, according to implementations of the subject matter described herein, an optimization scheme of a learning network is provided. In this scheme, the learning network is optimized by updating combined values of parameters associated with the base paths so as to determine values of the parameters of the learning network for use. In this manner, it is possible to achieve the aim of optimizing the learning network by updating combined values of parameters on base paths of a learning network, which will not only improve the optimization efficiency of the learning network but also have the optimal values of the parameters determined more accurately and quickly.

Figure 4:
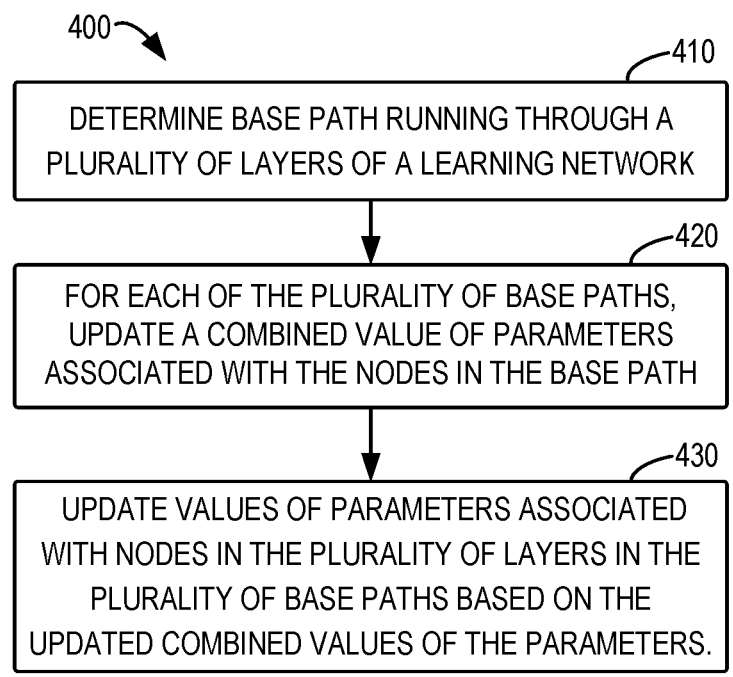
FIG. 4 illustrates a flowchart of a process for optimization of a learning network according to some implementations of the subject matter described herein.

FIG. 4 illustrates an illustrative process 400 for optimization of a learning network according to implementations of the subject matter described herein. The process 400 may be implemented by the computing device 100 illustrated in FIG. 1. For purpose of discussion, this process is described with reference to FIG. 1. The process 400 may be used to train the learning network 180 shown in FIG. 1 to determine parameters associated with respective nodes of the learning network 180.

At 410, the computing device 100 determines base paths running through a plurality of layers of the learning network 180. As shown in the example in FIG. 1, a plurality of layers of the learning network 180 may form a hierarchical structure in which the outputs of a previous layer serves as the inputs of a next layer for further processing. Two nodes having input transferred may be considered as being connected. An input transferred between the two nodes is further adjusted by a corresponding parameter. The learning network 180 includes an input layer, and nodes of the input layer correspond to inputs of the learning network for providing the corresponding inputs to the nodes at the next layer as inputs for nodes of the next layer. The inputs of the nodes at the next layer is also adjusted by the corresponding parameters.

The plurality of layers considered in the implementations of the subject matter described herein are a plurality of layers on which nodes process inputs from nodes of a previous layer using an activation function with a scaling invariant property. Therefore, in general, the Softmax layer in the learning network (for example, layer4 in the learning network 180) may be excluded because this layer uses the Softmax function that does not have the scaling invariant property. In some examples, a plurality of layers in question are hidden layers of the learning network 180. In some examples, in addition to the hidden layers, the plurality of layers considered in the implementations of the subject matter described herein include the input layer of the learning network (for example, layer1 of the learning network 180) because this input layer provides inputs for the next hidden layer. In the example of the learning network 180 illustrated in FIG. 1, base paths through layer1 to layer3 may be considered. In some implementations, the plurality of layers in question are fully-connected layers. In addition to the plurality of layers associated with the activation function having the scaling invariable attribute, the learning network 180 may further include other hidden layers on which nodes process the inputs with an activation function that does not have the scaling invariant property.

Different from the conventional scheme of building the representation of the learning network in the parameter space, in the implementations of the subject matter described hererein, the learning network 180 may be represented in a path space. Each path of the learning network 180 may include a single node in each of the plurality of layers of the learning network 180. The inputs provided by the input layer of the learning network goes through each of these paths and are adjusted by input parameters associated with the nodes in the path and processed by the activation function of the nodes in the path; the output is provided at the last layer of the learning network 180. Based on all the paths of the learning network 180, an optimization function may be represented as Loss ($o_1, \ldots, o_K$; Label), as an optimization target of the learning network 180, and $$O_k = \sum_{Path \to O_k} Value_{path} * Active_{path} * Input_{path} \quad (15)$$

where $O_k$ represents the kth final output of the plurality of layers of the learning network. For example, in a learning network for multi-classification, $o_1, \ldots, o_K$ represents K final output of the layer prior to the Softmax layer. Equation (6) represents that for all the paths that contributes to $O_k$, the value of $O_k$ depends on a linear combination of values of all the paths (represented as Value$_{path}$), an indication of whether a path is active (represented as Active$_{path}$), and inputs of the first layer of the path (represented as Input$_{path}$). The determination of activation or inactivation of a path will be discussed in detail in the following.

As discussed in the above principle section, any path of the learning network 180 may be determined using the base paths. The processing in the base paths may be considered linearly independent. More specifically, for a given learning network, if a plurality of paths have a characteristic of linear independence when its status (active or inactive) remains unchanged, these paths may be considered as base paths of the learning network. Since such base paths are extracted from the all the paths of the learning network, the loss function employed during the training process may be represented with a linear combination of path values effectively, thereby reducing the redundancy.

In a specific example, it is assumed that the optimization objective of the learning network 180 is represented by a cross-entropy loss function commonly used in the training of the learning network. In the example of the learning network 180 shown in FIG. 1, for input data $x \in \mathbb{R}^d$ and output data $y \in \mathbb{R}^K$ in the training data, the cross-entropy loss function of the learning network 180 may be represented as:

$$l(W, V, U; x, y) = \frac{1}{n} \sum_{i=1}^{n} \sum_{k=1}^{K} y_i^k \log p_i^k \quad (16)$$

where $$p_i^k = \frac{e^{U_k^T O(W, V; x^i)}}{\sum_{j=1}^{K} e^{U_k^T O(W, V; x^i)}}$$

is the Softmax operation. The number of nodes at layer1 is the same as the number of inputs (i.e., d). In this example, it is assumed that the number of nodes at layer2 is S and all the parameters W for adjusting the inputs passed from layer1 to layer2 are the matrix of d×S, and the processing performed by all the nodes of layer2 through the ReLU activation function is represented as $\sigma(W^T x) = [\sigma_1, \ldots, \sigma_S]^T$. It is assumed that the number of nodes at layer3 is M, all the parameters V for adjusting the inputs passed from layer2 to layer3 are the matrix of S×M and the outputs of the layer3 is represented as $O(W,V;x) = [O_1, \ldots O_M]^T$. It can be seen that the cross-entropy loss function of Equation (16) is associated with the outputs of layer3.

The m-th output $O_m$ at layer3 may be represented as:

$$O_m = \sum_{s=1}^{S} v_{ms} \sigma_s = \sum_{s=1}^{S} v_{ms} \sigma_{relu}\left(\sum_{j=1}^{d} w_{sj} x_j\right) \quad (17)$$

$$= \sum_{s=1}^{S} \sum_{j=1}^{d} v_{ms} w_{sj} x_j \sigma \cdot a_s,$$

where if the activation function $\sigma_s$ is in the active status (namely, contributing), then $a_s = 1$, and if the activation function is in the inactive status (namely, not contributing), then $a_s = 0$. It is assumed that $p_{mj}^s = v_{ms} w_{sj}$ represents a path, and the output $O_m$ may be represented in the path space as:

$$O_m = \sum_{s=1}^{S} \sum_{j=1}^{d} p_{mj}^s x_j \cdot a_s \quad (18)$$

The Equation (18) indicates that the output of the last layer of the layers of the learning network 180 may be represented in the path space. As discussed in the above principle section, among all the paths of the layers that an input of the learning network may pass through, only processing in some of the paths is linearly independent from each other. These paths may be referred to as base paths. A base path may be construed as an equivalent class of the learning network at the path level. The determination of the base paths will be described below in detail.

As mentioned above in the principle section, the rank of a matrix A in a linear mapping of the learning network may be calculated as rank(A)=$dh_1 + h_1 h_2 + \ldots + h_{L-1} h_L + h_L d_1 - \ldots - h_L$, which implies that the number of linearly-independent base paths of the learning network is a difference between the number of all the parameters of the learning network (that is, $dh_1+h_1h_2+ \ldots +h_{L-1}h_L+h_Ld_1$) and the number of nodes ($h_1+ \ldots +h_L$). Linearly independent base paths may be determined with some methods.

As mentioned above, each base path includes a single node at each of the plurality of layers. Since the plurality of layers are fully-connected layers, each node in each base path will obtain an input from the node of the previous layer, and the input will be adjusted by a parameter associated with the node. Therefore, a connection between nodes of adjacent layers may be considered as a path segment of the base path. If in a base path, a given node obtains an input from the node of the previous layer included in the base path, then the node at the previous layer is also referred to as an upstream node of the given node.

In some implementations, the computing device 100 determines a first set of base paths running through a plurality of layers of the learning network 180 such that the first set of base paths include all the nodes in the plurality of layers. The first set of base paths are used as skeleton paths to facilitate subsequent selection of base paths. In some implementations, the first set of base paths may include a minimum number of paths having all the nodes of the plurality of layers comprised therein. There are various methods for determining the first set of base paths from the learning network 180. For example, it is possible to select a node at each of the plurality of layers randomly and use the selected nodes to form a base path in the first set. When all the nodes on the layers are selected, the determination of the base paths is completed. Nodes contained in each base path in the first set all differ from each other.

As an alternative to the random selection, it is also possible to determine the first set of base paths with a deterministic method. For example, for the l-th layer of the plurality of layers (for instance, L layers) of the learning network 180, the j-th node at the l-th layer is selected; for the j-th node at the l-th layer, the j-th node at the l+1th layer is selected; and then the nodes are selected in a similar fashion until the L-layer. If for some nodes at the l-th layer of the layers, there is no the j-th node at the corresponding l+1th layer, a node might be selected randomly at the l+1th layer. From each node at the first layer of the layers, the nodes selected from all the layers in this way form the first set of base paths. By means of the selection, a minimum number of base paths may be determined as the first set of base paths such that any of all nodes in the layers is included in at least one base path in the first set.

Figure 5:
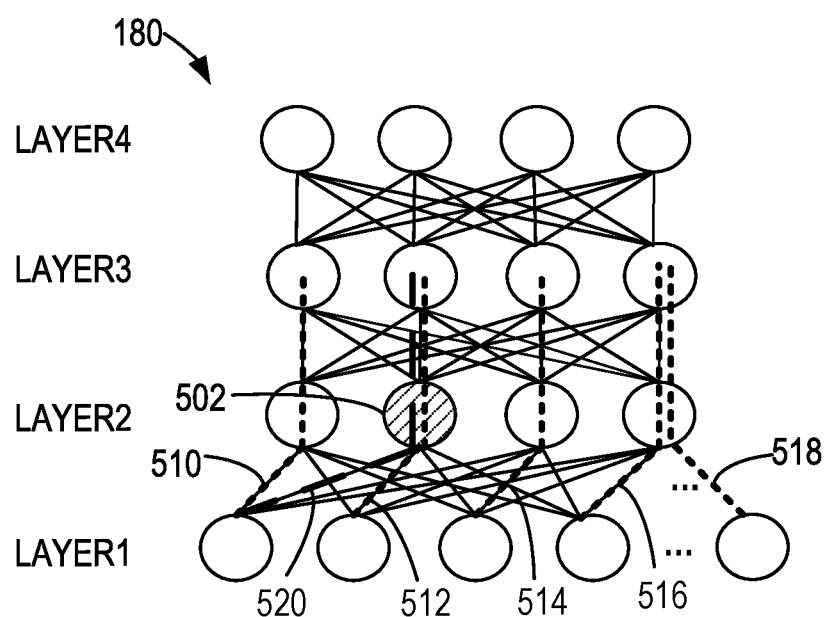
FIG. 5 illustrates a schematic diagram of determining a base path in the learning network shown in FIG. 1 according to some implementations of the subject matter described herein.

FIG. 5 illustrates a schematic diagram of determining a base path in the learning network 180 shown in FIG. 1. For the first set of base paths, a first node (for example, the first node in the order from left to right) of layer1 may be selected first and then the first node of layer2 may be selected and the first node of layer3 is selected. All these selected nodes form a base path 510 in the first set of base paths.

Base paths 512, 514 and 516 in the first set of base paths may also be selected in a manner similar as the base path 510. Since the number of nodes at layer1 is larger than at layer2, for a node at layer1 (such as the $x_d$-th node corresponding to the input $x_d$), there is no a $x_d$-th node at layer2; thus, a node at layer2 is selected randomly. Similarly, a node at layer3 may also be selected randomly. These nodes form a base path 518 starting from the $x_d$-th node of layer1. This base path 518 is also included in the first set of base paths which include all the nodes from layer1 to layer3 of the learning network 180.

Taking the first set of base paths as a skeleton, the computing device 100 may continue to determine a second set of base paths. The second set of base paths are determined such that any given base path in the second set to include only one different node. The parameter associated with the different node in the given base path being different from a parameter associated with the different node in any base path including the different node in the first set. Since the parameter associated with a node in any base path in the first set or second set is used to adjust the input obtained from an upstream node of the node, it can be determined that for any given base path in the second set of base paths, the upstream node of its different node in the given base path is different from the upstream node of the different node in any base path that includes the different node in the first set. This restriction makes only one path segment in a given base path in the second set different from the path segment of any base path including the different node in the first set.

As shown in FIG. 5, in the learning network 180, after the first set of base paths 510, 512, 514, 516 and 518 are determined, a base path 520 in the second set may be determined, which only includes one different node 502. The parameter associated with the different node 502 in the base path 520 differs from the parameter associated with the different node 502 in the base path 512 of the first set. This is because in the base paths 512 and 520 which both include the different node 502, the different node 502 obtains different inputs from different upstream nodes and thus the parameters for adjusting the different inputs are considered to be different. Other base paths in the second set may be determined in a similar manner.

Still referring to FIG. 4, for each of the plurality of base paths, the computing device 100 updates, at 420, a combined value of parameters associated with the nodes in the base path. In implementations of the subject matter described herein, the updating is performed on the basis of the combined value of the parameters associated with the nodes in each base path. A combined value of the parameters associated with the nodes in each base path may include a product of current values of these parameters. The training data 170 may be used to update the learning network 180. Various available training methods may be utilized to perform the updating of the combined value of the parameters.

During the updating, it is possible to update the combined value of the parameters associated with the nodes in each base path using training data based on the optimization objective of the learning network 180 so as to gradually approximate the optimization objective. The optimization objective may be represented by a loss function in an example. To perform the updating on the basis of the combined value of the parameters associated with the nodes in each base path, the loss function may be represented as a function associated with a representation of the base paths, such as Loss (BasePath). As mentioned above, a space of the base paths is equal to an equivalent class space of a learning network.

To update the combined value of the parameters associated with the nodes in each base path, in the example of training using a stochastic gradient descent method, the maximum variation trend (also referred to a gradient) of the loss function with respect to each base path may be determined, representing as $$\frac{\partial Loss}{\partial BasePath}.$$

Then the updated combined value of the parameters associated with the nodes in a base path may be determined based on an update step size associated with the gradient and a previous combined value of the parameters associated with the nodes in this base path. Initially, the parameters associated with the nodes in each base path may be set randomly as initial values or values obtained through other pre-training process.

In the specific example of using a cross-entropy loss function as the optimization objective of the learning network 180 as mentioned above, it is assumed that $m_s = s \bmod M$, $j_s = s \bmod d$ and the base paths of the learning network are determined as:

$$\{p_{m_s 1}^s, \ldots, p_{m_s d}^s, p_{1 j_s}^s, \ldots, p_{m_s-1, j_s}^s, p_{m_s+1, j_s}^s, \ldots, p_{M, j_s}^s\} \quad (19)$$

Any path $p_{mj}^S$ of the learning network 180 may be determined using the base paths:

$$p_{mj}^s = \frac{p_{m j_s}^s \cdot p_{m_s j}^s}{p_{m_s j_s}^s} \quad (20)$$

Thus, the representation of the output $O_m$ ($m \in [M]$) at layer3 of the learning network 180 in the path space may be modified from Equation (18) as:

$$O_m = \sum_{s=1}^{S} \sum_{j=1}^{d} \frac{p_{m j_s}^s \cdot p_{m_s j}^s}{p_{m_s j_s}^{s \, 2}} \cdot x_j \cdot a_s \quad (21)$$

Therefore, the cross-entropy loss function $l(W, V, U; x, y)_i$ of the learning network 180 in Equation (16) may be represented as $l(P, U; x, y)$, where P indicates the equivalent class space of the learning network 180.

In some examples, when the combined values of parameters associated with nodes in each base path are updated, it is possible to use chain rule to determine the gradient of the loss function with respect to each base path, namely, $$\frac{\partial \text{Loss}}{\partial \text{BasePath}}.$$

For example, based on chain rule, $$\frac{\partial \text{Loss}}{\partial \text{BasePath}}$$

may be determined as:

$$\frac{\partial \text{Loss}}{\partial \text{BasePath}} = \sum_{output} \frac{\partial \text{Loss}}{\partial \text{Output}} * \sum_{path} \frac{\partial \text{Loss}}{\partial \text{Path}} * \frac{\partial \text{Path}}{\partial \text{BasePath}} \quad (22)$$

where $$\frac{\partial \text{Loss}}{\partial \text{Output}}$$

represents a sum of derivatives of the loss function with respect to the corresponding outputs of the learning network 180, $$\frac{\partial \text{Output}}{\partial \text{Path}}$$

represents a sum or derivatives of each output with respect to each of the paths, and $$\frac{\partial \text{Path}}{\partial \text{BasePath}}$$

represents derivatives of each path with respect to the base paths.

According to the chain rule, it is also possible to calculate the gradient of the loss function with respect to each base path in other ways of derivatives. In the specific example of the cross-entropy loss function described above, the derivative of the loss function $l(P, U; x, y)$ with respect to each base path may be determined according to the chain rule. For example, considering the base paths $p_{m j_s}^s$, $p_{m_s j}^s$ and $p_{m_s j_s}^s$ of the learning network 180, the derivative of the loss function $l(P, U; x, y)$ with respect to each base path may be represented as:

$$\frac{\partial l(P, U; x, y)}{\partial p_{m j_s}^s} = \frac{\partial l(P, U; x, y)}{\partial O_m} \cdot \frac{\partial O_m}{\partial p_{m j_s}^s} \quad (22)$$

$$= \frac{\partial l(\tilde{P}, U; x, y)}{\partial O_m} \cdot \sum_{j=1}^{d} \frac{p_{m_s j}^s}{p_{m j_s}^s} \cdot x_j \cdot a_s$$

$$\frac{\partial l(P, U; x, y)}{\partial p_{m_s j}^s} = \sum_{m=1}^{M} \frac{\partial l(P, U; x, y)}{\partial O_m} \cdot \frac{\partial O_m}{\partial p_{m_s j}^s} \quad (23)$$

$$= \sum_{m=1}^{M} \frac{\partial l(P, U; x, y)}{\partial O_m} \cdot \frac{p_{m j_s}^s}{p_{m_s j_s}^s} \cdot x_j \cdot a_s$$

$$\frac{\partial l(P, U; x, y)}{\partial p_{m_s j_s}^s} = \sum_{m=1}^{M} \frac{\partial l(P, U; x, y)}{\partial O_m} \cdot \frac{\partial O_m}{\partial p_{m_s j_s}^s} \quad (24)$$

$$= \frac{\partial l(P, U; x, y)}{\partial O_{m_s}} \cdot x_{j_s} \cdot a_s +$$

$$\sum_{m \neq m_s} \sum_{j \neq j_s} \frac{\partial l(P, U; x, y)}{\partial O_m} \cdot \frac{p_{m j_s}^s \cdot p_{m_s j}^s}{-(p_{m_s j_s}^s)^2} \cdot x_j \cdot a_s$$

The updating rule for the combined value of the parameters associated with nodes in each base path may be represented as:

$$(p_{m_s j}^s)^{t+1} = (p_{m_s j}^s)^t - \eta \cdot \frac{\partial l(P, U; x, y)}{\partial p_{m_s j}^s} \quad (25)$$

$$(p_{m j_s}^s)^{t+1} = (p_{m j_s}^s)^t - \eta \cdot \frac{\partial l(P, U; x, y)}{\partial p_{m j_s}^s} \quad (26)$$

-continued $$(p_{m_s,j_s}^s)^{t+1} = (p_{m_s,j_s}^s)^t - \eta \cdot \frac{\partial l(P, U; x, y)}{\partial p_{m_s,j_s}^s} \qquad (27)$$

where $(p)^t$ represents the current combined value of the parameters associated with the nodes in a base path p, $(p)^{t+1}$ represents the updated combined value of the parameters associated with the nodes in the base path p, and η may be set to a fixed value, representing the learning rate of the combined value.

It has been discussed above the determining of the derivative of the loss function with respect to each base path so as to update the combined value of the parameters associated with the nodes in each base path. In the example of determining the derivative based on Equation (22), since the derivatives for all the paths for the learning network are to be calculated, the computing overhead is expensive. In the other examples of the subject matter described herein, to further reduce the computing efficiency for updating the combined values of parameters, the combined value corresponding to an entire base path may be updated by updating parameters associated with some nodes in each base path.

Particularly, according to the chain rule, a derivative of the loss function with respect to a given parameter may be associated with a derivative of the loss function with respect to a base path and a derivative of the base path with respect to a parameter, which may be represented as Loss→BasePath→Weight. As the derivative of the loss function with respect to the parameter may be determined based on backward propagation (BP), while the overhead of calculating the derivative of the loss function with respect to the parameter is lower, the update step size for the parameter may be determined using the derivative of the loss function with respect to the parameter and thus the combined value corresponding to the entire base path may be determined in turn.

During the updating, it is expected to select the parameters to be used for the updating reference in each base path evenly. Particularly, for each of the first set of base paths determined above, it is possible to determine an update step size for a parameter associated with any node in the base path based on the optimization objective of the learning network 180. The update step size for the parameter associated with any node may be determined by calculating the derivative of the optimization objective (i.e., the loss function) with respect to the parameter. The update step size may be equal to the derivative result or proportional to the derivative result. For each of the second set of base paths determined above, it is possible to determine the update step size for the parameter associated with the different node in this base path based on the optimization objective of the learning network 180. Furthermore, for each base path, the combined values of parameters associated with the nodes in this base path may be updated based on the determined update step size for the parameter.

To understand the updating of the combined value based on the parameter, a specific example is used to describe the updating of a combined value of the parameters associated with the nodes in a base path. It is assumed that in a given base path p1 in the second set of base paths, the parameter associated with the different node is represented as u1, then the derivative of the loss function with respect to the parameter u1 may be represented as:

$$\frac{\partial loss}{\partial u_1} = \sum_i \frac{\partial loss}{\partial p_i} \cdot \frac{\partial p_i}{\partial u_1} = \frac{\partial loss}{\partial p_1} \cdot \frac{\partial p_1}{\partial u_1} \qquad (28)$$

where the value of i may be in a range from one to the number of base paths of the learning network 180. Since the derivative $$\frac{\partial loss}{\partial u_1}$$

can be determined through the backward propagation and $$\frac{\partial p_1}{\partial u_1}$$

may also be determined, the derivative $$\frac{\partial loss}{\partial p_1}$$

of the loss function with respect to the base path p1 may be determined based on Equation (28). This derivative may be used to update the combined values of the parameters associated with the nodes in the base path p1. For any other base path in the second set of base paths, the derivative of the loss function with respect to the parameter associated with the different node in this base path may be determined in a similar way, and the combined value of the parameters associated with the nodes in the base path is updated in turn.

It is assumed that in a base path p2 in the first set of base paths, a parameter $w_1$ associated with any node in the base path is selected. The derivative of the loss function with respect to the parameter $w_1$ may be represented as:

$$\frac{\partial loss}{\partial w_1} = \frac{\partial loss}{\partial p_2} \cdot \frac{\partial p_2}{\partial w_1} + \frac{\partial loss}{\partial p_3} \cdot \frac{\partial p_3}{\partial w_1} + \frac{\partial loss}{\partial p_4} \cdot \frac{\partial p_4}{\partial w_1} \qquad (29)$$

where the derivative $$\frac{\partial loss}{\partial w_1}$$

may be determined through the backward propagation, base paths p3 and p4 may be any base paths in the second set of base paths or the base paths involving the parameter $w_1$ in the second set of base paths.

$$\frac{\partial loss}{\partial p_3} \text{ and } \frac{\partial loss}{\partial p_4}$$

may be determined by Equation (28). Derivatives $$\frac{\partial p_2}{\partial w_1}, \frac{\partial p_3}{\partial w_1} \text{ and } \frac{\partial p_4}{\partial w_1}$$

may be calculated correspondingly.

Through Equation (29), the derivative $$\frac{\partial loss}{\partial p_2}$$

of the loss function with respect to the base path p2 may be determined. The derivative may be used to update the combined value of the parameters associated with the nodes in the base path p2. For any other base path in the first set of base paths, the derivative of the loss function with respect to a parameter associated with the different node in the base path may be determined in a similar way and the combined value of the parameters associated with the nodes in the base path are updated in turn.

In some implementations, it is determined whether the status of the base path is active or inactive, and then only the active base paths are updated. In some implementations, for a given base path, it is determined whether all the nodes included in the base path are in the active status (i.e., the active parameters are to be applied for processing the inputs of the nodes). If all the nodes included by the base path are in the active status, then it is determined that the base path is in the active status. If one or more nodes included in the base path are in the inactive status, then the base path is in the inactive status.

The active or inactive status of each node is related to all the parameters associated with this node and all the inputs received by the nodes from the previous layer. By forward propagation of the updating of the associated parameters, the active or inactive status of the node may be determined. If the result of adjusting the inputs of the node by the updated parameters (i.e., a weighted sum of the inputs) is greater than zero, then the node is in the active status. Otherwise, the node is determined to be in the inactive status. The updating of the parameters will be described below.

Still referring to FIG. 4, the computing device 100 updates, at 430, values of the parameters associated with the nodes in the plurality of layers in the plurality of base paths based on the updated combined values of the parameters. The values of parameters associated with each node in the plurality of base paths correspond to parameters for adjusting the inputs received by this node from all the nodes at the previous layer. In implementations of the subject matter described herein, instead of optimizing each parameter individually, the combined values of parameters associated with nodes in the base paths are optimized based on the optimization objective of the learning network. The updating or determining of each parameter is performed by determining the combined values of parameters of the base paths, which may reduce the calculation amount.

In order to determine the parameter associated with each node of the learning network 180, according to the updated combined values of parameters, the current values of parameters associated with one or more nodes in each base path may be increased or decreased randomly or in other predetermined manners to obtain updated values of the parameters. For example, for a given base path, one or more nodes may be selected from this base path randomly or in other predefined manners and the parameters associated with these nodes are updated. The value of each parameter may be updated linearly or non-linearly in proportion and the update step size for the parameter may be related to the update step size for the combined value for the corresponding base path or may be a fixed value. In some implementations, only the values of parameters associated with nodes in the active status are updated.

A specific example for updating a parameter is provided below, which example is still based on the example of the cross-entropy loss function of the learning network 180 mentioned above. In this example, each parameter may be updated proportionally. It is assumed that the ratio $$\frac{v_{m,s}^{t+1}}{v_{m,s}^{t}}$$

of an updated value and a current value for a parameter $v_{m,s}$ of the learning network 180 is represented as $\Delta v_{m,s}^{t+1}$, and the ratio $$\frac{w_{s,j}^{t+1}}{w_{s,j}^{t}}$$

of an updated value and a current value for the parameter $w_{s,j}$ is represented as $\Delta w_{s,j}^{t+1}$. If a given node $\sigma_1$ is in the active status, a plurality of (in this example, M+d−1) linear equations for $\Delta v_{m,s}^{t+1}$ and $\Delta v_{m,s}^{t+1}$ (where s=1) may be determined as follows:

$$\Delta v_{m_1,1}^{t+1} \Delta w_{1,1}^{t+1} = 1 - \eta \frac{1}{p_{m_1,1}^1} \frac{\partial l(P^t, U^t; x, y)}{\partial p_{m_1,1}^1} \quad (30)$$

...

$$\Delta v_{m_1,1}^{t+1} \Delta w_{1,d}^{t+1} = 1 - \eta \frac{1}{p_{m_1,d}^1} \frac{\partial l(P^t, U^t; x, y)}{\partial p_{m_1,d}^1}$$

$$\Delta v_{1,1}^{t+1} \Delta w_{1,j_1}^{t+1} = 1 - \eta \frac{1}{p_{1,j_1}^1} \frac{\partial l(P^t, U^t; x, y)}{\partial p_{1,j_1}^1}$$

...

$$\Delta v_{M,1}^{t+1} \Delta w_{1,j_1}^{t+1} = 1 - \eta \frac{1}{p_{M,j_1}^1} \frac{\partial l(P^t, U^t; x, y)}{\partial p_{M,j_1}^1}$$

Since there are only (M+d−1) equations and (M+d) ratios in total are unknown, in some implementations, a ratio (such as a ratio $\Delta v_{m_1}{'}1$) may be selected randomly and set as equal to 1. Through the above equations and $\Delta v_{m_1}{'}1=1$, other ratios may be determined. When the ratios and $\Delta v_{m,s}^{t+1}$ and $\Delta v_{m,s}^{t+1}$ (where s=1) are determined, the parameter $w_{s,j}$ associated with the node $\sigma_1$ may be updated to obtain an updated value $w_{s,j}^{t+1}$. In addition, the parameter $v_{m,s}$ (also the output parameter of $\sigma_1$) of the node at the next layer to which node $\sigma_1$ is connected may also be updated, thereby obtaining the updated value $v_{m,s}^{t+1}$. As $\Delta v_{m_1,1}^{t}$ is set as 1, the corresponding parameter is not updated. In some implementations, when resolving the above Equation (30), more ratios may be set to 1 so that the corresponding parameters are not updated. For other nodes of the learning network, parameter updating may be performed in a similar fashion.

Figure 6:
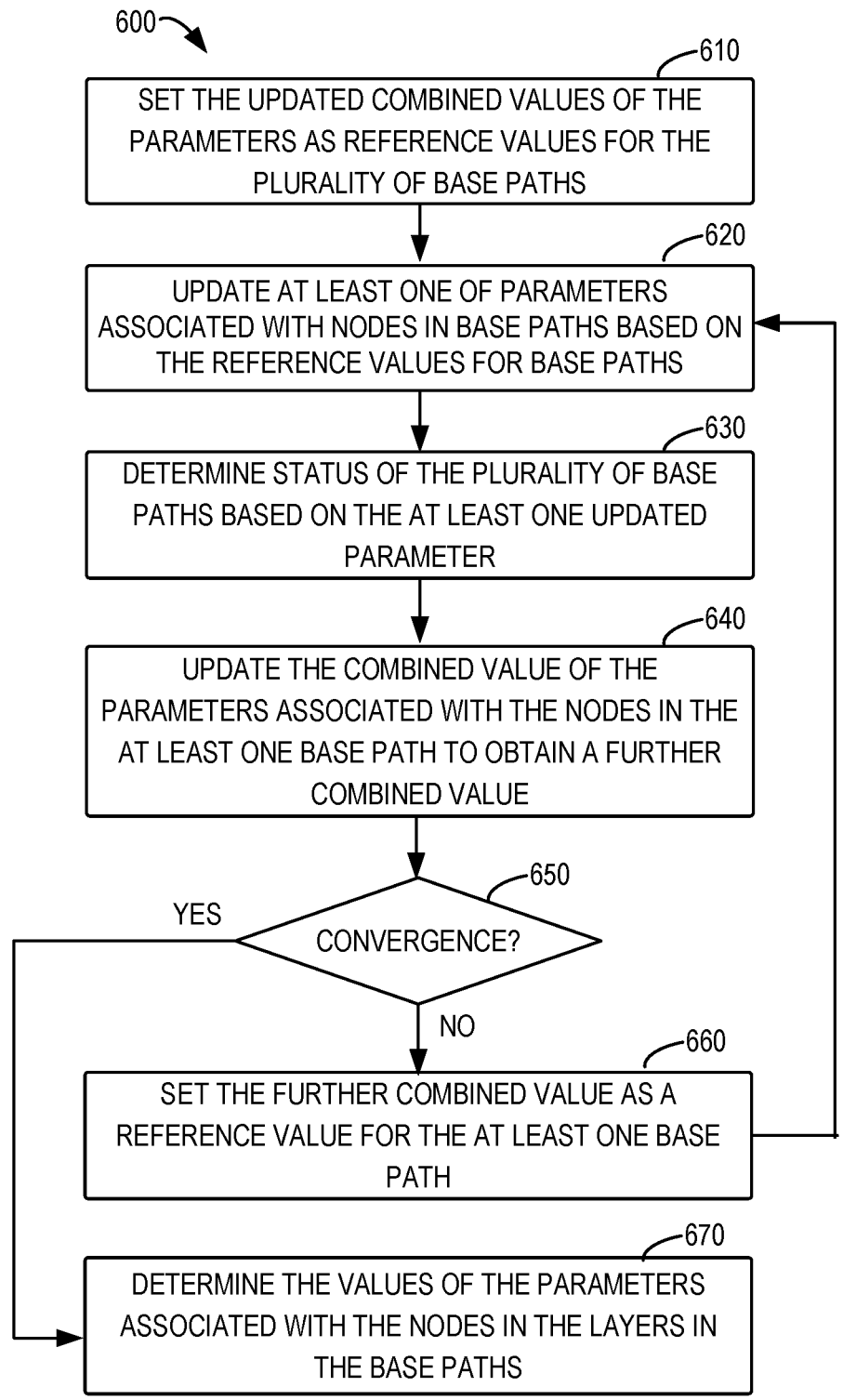
FIG. 6 illustrates a flowchart of a process for updating parameters according to some implementations of the subject matter described herein.

In some implementations, the optimization objective of the learning network 180 may not be reached by updating the combined values of the parameters only once. Therefore, the combined value of the parameters associated with the nodes in each base path may be updated continuously in a iteration process and then the values of the parameters associated with the nodes are updated. The convergence time of the iteration process is when the optimization objective of the learning network 180 is reached (for example, when the loss function is minimized). Such an iteration process 600 is described below with reference to FIG. 6. It is to be understood that the process 600 is a specific implementation for updating parameters at 430 in the process 400.

At 610, current combined values of the parameters of the plurality of base paths (such as the combined values after the first time of updating) are determined as reference values for the plurality of base paths. At 620, at least one of the parameters associated with the nodes in the plurality of base paths is updated based on the reference values for the plurality of base paths. The updating of the parameters is similar to the updating discussed above. The selection of a parameter may be random or performed in a predetermined manner (for example, a different parameter is selected for each iteration). The update step size may depend on the update step size for the reference values or be set as a fixed value.

At 630, status of the plurality of base paths are determined based on at least one updated parameter. The status of a base path may include active status or inactive status. As mentioned above, the status of each base path depends on the corresponding status of nodes in the base path. The status of each node is determined by forward propagation of the updating on the parameters associated with that node.

If there is at least one base path in the active status, at 640, the combined value(s) of the parameters associated with the nodes in the at least one base path is updated to obtain a further combined value(s). The updating of the combined value at 640 may be based on the method similar to the updating of the combined value at 420 during the process 400. At 650, it is determined whether a convergence condition is satisfied based on the further combined value(s) obtained after updating. If the value of the loss function represented by the base path is reduced to a predetermined threshold or reaches a minimum, the convergence condition may be determined to be satisfied; otherwise, the convergence condition is not satisfied.

If the convergence condition is unsatisfied, it may be needed to continue to update the combined values and the values of the parameters. Therefore, at 660, in response to the convergence condition being unsatisfied, the further combined value(s) is set as the reference value(s) for the at least one base path. The process 600 then returns to 620 for further processing. If the convergence condition is satisfied, at 670, the values of the parameters associated with the nodes in the plurality of layers in the plurality of base paths are determined. Since the convergence condition has been satisfied and the parameters associated with one or more nodes on the layers during the process 600 have been updated once or several times, at 670, the current values of the parameters associated with the nodes on the layers may be determined directly. In some other implementations, at 670, it is determined that the parameters of some nodes may be further updated based on the further combined value(s) obtained when the convergence condition is satisfied, so as to obtain the parameters for these nodes.

After the process 600 ends, the values of the parameters associated with the nodes of the learning network 180 in the plurality of base paths may be determined so as to obtain the optimized values of parameters for the learning network 180. The value of each parameter may be updated once or more times during the process 600 or maintained as the initial values, which does not affect the outputs of the learning network 180 (considering the invariance of the learning network 180).

In some implementations, during the process 600, the updating at 600 may also be omitted and the current value of each parameter after the process 600 is output directly as an optimized value of parameters of the learning network 180.

Through the optimization process of the subject matter described herein, the learning network 180 may be provided for use by the computing device 100 or other computing devices to process any given input and provide the corresponding output. During the processing, the optimized values of parameters of the learning network 180 are used to adjust the input transferred between adjacent layers of the learning network 180.

EXAMPLE IMPLEMENTATIONS

Some exemplary implementations of the subject matter described herein are listed below.

In one aspect, a computer-implemented method is provided in the subject matter described herein. The method comprises determining a plurality of base paths running through a plurality of layers of a learning network, each node in the plurality of layers utilizing an activation function with a scaling invariant property to process an input from a node of a previous layer, each base path comprising a single node in each of the plurality of layers, and processing in the plurality of base paths being linearly independent from each other; for each of the plurality of base paths, updating a combined value of parameters associated with the nodes in the base path, a parameter associated with a node in each base path being for adjusting the input obtained by the node from a node of a previous layer; and updating values of the parameters associated with the nodes in the plurality of layers in the plurality of base paths based on the updated combined values of the parameters.

In some implementations, determining the plurality of base paths comprises: determining a first set of base paths running through the plurality of layers of the learning network such that the first set of base paths comprise all the nodes in the plurality of layers; and determining a second set of base paths running through the plurality of layers of the learning network such that any given base path in the second set comprises only one different node, the parameter associated with the different node in the given base path being different from a parameter associated with the different node in any base path comprising the different node in the first set.

In some implementations, updating the combined values of the parameters comprises: for each base path in the first set, determining an update step size for a parameter associated with any node in the base path based on an optimization objective of the learning network; and updating the combined value of the parameters associated with the nodes in the base path based on the update step size for the parameter.

In some implementations, updating the combined values of the parameters comprises: for each base path in the second set, determining an update step size for the parameter associated with the different node in the base path based on an optimization objective of the learning network; and updating the combined value of the parameters associated with the nodes in the base path based on the update step size for the parameter.

In some implementations, the first set of base paths comprise a minimum number of paths having all the nodes of the plurality of layers comprised therein.

In some implementations, updating the values of the parameters comprises: setting the updated combined values of the parameters as reference values for the plurality of base paths; performing the following iteratively for at least one time: updating at least one of the parameters associated with the nodes in the plurality of base paths based on the reference values for the plurality of base paths, determining status of the plurality of base paths based on the at least one updated parameter, the status comprising active status or inactive status, in response to determining that the status of at least one of the plurality of base paths is the active status, updating the combined value of the parameters associated with the nodes in the at least one base path to obtain a further combined value, determining whether a convergence condition is satisfied based on the further combined value, and in response to the convergence condition being unsatisfied, setting the further combined value as a reference value for the at least one base path; and in response to the convergence condition being satisfied, determining the values of the parameters associated with the nodes in the plurality of layers in the plurality of base paths.

In some implementations, the combined value of the parameters associated with the nodes in each base path comprises a product of the values of the associated parameters In some implementations, the activation function comprises at least one of the following: a ReLU function or a piecewise linear function.

In some implementations, the plurality of layers comprise a plurality of fully-connected layers.

In another aspect, there is provided a device in the subject matter described herein. The device comprises: a processing unit; and a memory coupled to the processing unit and comprising instructions stored thereon, the instructions, when executed by the processing unit, causing the device to perform acts comprising: determining a plurality of base paths running through a plurality of layers of a learning network, each node in the plurality of layers utilizing an activation function with a scaling invariant property to process an input from a node of a previous layer, each base path comprising a single node in each of the plurality of layers, and processing in the plurality of base paths being linearly independent from each other; for each of the plurality of base paths, updating a combined value of parameters associated with the nodes in the base path, a parameter associated with a node in each base path being for adjusting the input obtained by the node from a node of a previous layer; and updating values of the parameters associated with the nodes in the plurality of layers in the plurality of base paths based on the updated combined values of the parameters.

In some implementations, determining the plurality of base paths comprises: determining a first set of base paths running through the plurality of layers of the learning network such that the first set of base paths comprise all the nodes in the plurality of layers; and determining a second set of base paths running through the plurality of layers of the learning network such that any given base path in the second set comprises only one different node, the parameter associated with the different node in the given base path being different from a parameter associated with the different node in any base path comprising the different node in the first set.

In some implementations, updating the combined values of the parameters comprises: for each base path in the first set, determining an update step size for a parameter associated with any node in the base path based on an optimization objective of the learning network; and updating the combined value of the parameters associated with the nodes in the base path based on the update step size for the parameter.

In some implementations, updating the combined values of the parameters comprises: for each base path in the second set, determining an update step size for the parameter associated with the different node in the base path based on an optimization objective of the learning network; and updating the combined value of the parameters associated with the nodes in the base path based on the update step size for the parameter.

In some implementations, the first set of base paths comprise a minimum number of paths having all the nodes of the plurality of layers comprised therein.

In some implementations, updating the values of the parameters comprises: setting the updated combined values of the parameters as reference values for the plurality of base paths; performing the following iteratively for at least one time: updating at least one of the parameters associated with the nodes in the plurality of base paths based on the reference values for the plurality of base paths, determining status of the plurality of base paths based on the at least one updated parameter, the status comprising active status or inactive status, in response to determining that the status of at least one of the plurality of base paths is the active status, updating the combined value of the parameters associated with the nodes in the at least one base path to obtain a further combined value, determining whether a convergence condition is satisfied based on the further combined value, and in response to the convergence condition being unsatisfied, setting the further combined value as a reference value for the at least one base path; and in response to the convergence condition being satisfied, determining the values of the parameters associated with the nodes in the plurality of layers in the plurality of base paths.

In some implementations, the combined value of the parameters associated with the nodes in each base path comprises a product of the values of the associated parameters In some implementations, the activation function comprises at least one of the following: a ReLU function or a piecewise linear function.

In some implementations, the plurality of layers comprise a plurality of fully-connected layers.

In a further aspect, there is provided a computer program product. The computer product is stored in a computer storage medium and comprising machine executable instructions which, when executed by the device, causing the device to: determine a plurality of base paths running through a plurality of layers of a learning network, each node in the plurality of layers utilizing an activation function with a scaling invariant property to process input from a node of a previous layer, each base path comprising a single node in each of the plurality of layers, and processing in the plurality of base paths being linearly independent from each other; for each of the plurality of base paths, update a combined value of parameters associated with the nodes in the base path, a parameter associated with a node in each base path being for adjusting the input obtained by the node from a node of a previous layer; and update values of the parameters associated with the nodes in the plurality of layers in the plurality of base paths based on the updated combined values of the parameters.

In some implementations, the machine executable instructions, when executed by the device, further cause the device to: determine a first set of base paths running through the plurality of layers of the learning network such that the first set of base paths comprise all the nodes in the plurality of layers; and determine a second set of base paths running through the plurality of layers of the learning network such that any given base path in the second set comprises only one different node, the parameter associated with the different node in the given base path being different from a parameter associated with the different node in any base path comprising the different node in the first set.

In some implementations, the machine executable instructions, when executed by the device, cause the device to: for each base path in the first set, determine an update step size for a parameter associated with any node in the base path based on an optimization objective of the learning network; and update the combined value of the parameters associated with the nodes in the base path based on the update step size for the parameter.

In some implementations, the machine executable instructions, when executed by the device, cause the device to: for each base path in the second set, determine an update step size for the parameter associated with the different node in the base path based on an optimization objective of the learning network; and update the combined value of the parameters associated with the nodes in the base path based on the update step size for the parameter.

In some implementations, the first set of base paths comprise a minimum number of paths having all the nodes of the plurality of layers comprised therein.

In some implementations, the machine executable instructions, when executed by the device, cause the device to: set the updated combined values of the parameters as reference values for the plurality of base paths; perform the following iteratively for at least one time: updating at least one of the parameters associated with the nodes in the plurality of base paths based on the reference values for the plurality of base paths, determining status of the plurality of base paths based on the at least one updated parameter, the status comprising active status or inactive status, in response to determining that the status of at least one of the plurality of base paths is the active status, updating the combined value of the parameters associated with the nodes in the at least one base path to obtain a further combined value, determining whether a convergence condition is satisfied based on the further combined value, and in response to the convergence condition being unsatisfied, setting the further combined value as a reference value for the at least one base path; and in response to the convergence condition being satisfied, determine the values of the parameters associated with the nodes in the plurality of layers in the plurality of base paths.

In some implementations, the combined value of the parameters associated with the nodes in each base path comprises a product of the values of the associated parameters In some implementations, the activation function comprises at least one of the following: a ReLU function or a piecewise linear function.

In some implementations, the plurality of layers comprise a plurality of fully-connected layers.

The functionally described herein can be performed, at least in part, by one or more hardware logic components. For example, and without limitation, illustrative types of hardware logic components that can be used include: Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this subject matter described herein, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are described in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   determining a plurality of base paths running through a plurality of layers of a learning network, each node in the plurality of layers utilizing an activation function with a scaling invariant property to process an input from a node of a previous layer, each base path comprising a single node in each of the plurality of layers, and input processing in the plurality of base paths being linearly independent from each other;
   for each of the plurality of base paths, determining a combined value of respective parameters associated with the nodes in the base path resulting in combined values of the parameters for the plurality of base paths, a parameter associated with a node of the nodes in each base path being for adjusting the input obtained by the node from a node of a previous layer; and updating, for the plurality of base paths, values of the parameters associated with the nodes in the plurality of base paths based on the combined values.

2. The method of claim 1, wherein determining the plurality of base paths comprises:

determining a first set of base paths running through the plurality of layers of the learning network such that the first set of base paths comprise all the nodes in the plurality of layers; and determining a second set of base paths running through the plurality of layers of the learning network such that any given base path in the second set comprises only one different node, the parameter associated with the different node in the given base path being different from a parameter associated with the different node in any base path comprising the different node in the first set.

3. The method of claim 2, wherein updating the combined values of the parameters comprises: for each base path in the first set, determining an update step size for a parameter associated with any node in the base path based on an optimization objective of the learning network; and updating the combined value of the parameters associated with the nodes in the base path based on the update step size for the parameter.

4. The method of claim 2, wherein updating the combined values of the parameters comprises: for each base path in the second set, determining an update step size for the parameter associated with the different node in the base path based on an optimization objective of the learning network; and updating the combined value of the parameters associated with the nodes in the base path based on the update step size for the parameter.

5. The method of claim 2, wherein the first set of base paths comprise a minimum number of paths having all the nodes of the plurality of layers comprised therein.

6. The method of claim 1, wherein updating the values of the parameters comprises:

setting the updated combined values of the parameters as reference values for the plurality of base paths;

performing the following iteratively for at least one time;

updating at least one of the parameters associated with the nodes in the plurality of base paths based on the reference values for the plurality of base paths, determining status of the plurality of base paths based on the at least one updated parameter, the status comprising active status or inactive status, in response to determining that the status of at least one of the plurality of base paths is the active status, updating the combined value of the parameters associated with the nodes in the at least one base path to obtain a further combined value, determining whether a convergence condition is satisfied based on the further combined value, and in response to the convergence condition being unsatisfied, setting the further combined value as a reference value for the at least one base path; and in response to the convergence condition being satisfied, determining the values of the parameters associated with the nodes in the plurality of layers in the plurality of base paths.

7. The method of claim 1, wherein the combined value of the parameters associated with the nodes in each base path comprises a product of the values of the associated parameters.

8. The method of claim 1, wherein the activation function comprises at least one of the following:

a rectified linear unit (ReLU) function or a piecewise linear function.

9. The method of claim 1, wherein the plurality of layers comprise a plurality of fully-connected layers.

10. A device, comprising:

a processing unit; and a memory coupled to the processing unit and comprising instructions stored thereon, the instructions, when executed by the processing unit, causing the device to perform acts comprising:

determining a plurality of base paths running through a plurality of layers of a learning network, each node in the plurality of layers utilizing an activation function with a scaling invariant property to process an input from a node of a previous layer, each base path comprising a single node in each of the plurality of layers, and input processing in the plurality of base paths being linearly independent from each other;

for each of the plurality of base paths, determining a combined value of respective parameters associated with the nodes in the base path resulting in combined values of the parameters for the plurality of base paths, a parameter of the respective parameters associated with a node of the nodes in each base path being for adjusting the input obtained by the node from a node of a previous layer; and updating, for the plurality of base paths, values of the parameters associated with the nodes in the plurality of base paths based on the combined values.

11. The device of claim 10, wherein determining the plurality of base paths comprises:

determining a first set of base paths running through the plurality of layers of the learning network such that the first set of base paths comprise all the nodes in the plurality of layers; and determining a second set of base paths running through the plurality of layers of the learning network such that any given base path in the second set comprises only one different node, the parameter associated with the different node in the given base path being different from a parameter associated with the different node in any base path comprising the different node in the first set.

12. The device of claim 11, wherein updating the combined values of the parameters comprises: for each base path in the first set, determining an update step size for a parameter associated with any node in the base path based on an optimization objective of the learning network; and updating the combined value of the parameters associated with the nodes in the base path based on the update step size for the parameter.

13. The device of claim 11, wherein updating the combined values of the parameters comprises: for each base path in the second set, determining an update step size for the parameter associated with the different node in the base path based on an optimization objective of the learning network; and updating the combined value of the parameters associated with the nodes in the base path based on the update step size for the parameter.

14. The device of claim 11, wherein the first set of base paths comprise a minimum number of paths having all the nodes of the plurality of layers comprised therein.

15. A computer program product being stored in a non-transitory computer storage medium and comprising machine executable instructions which, when executed by a device, causing the device to:

determine a plurality of base paths running through a plurality of layers of a learning network, each node in the plurality of layers utilizing an activation function with a scaling invariant property to process input from a node of a previous layer, each base path comprising a single node in each of the plurality of layers, and input processing in the plurality of base paths being linearly independent from each other;

for each of the plurality of base paths, determine a combined value of respective parameters associated with the nodes in the base path resulting in combined values of the parameters for the plurality of base paths, a parameter of the respective parameters associated with a node of the nodes in each base path being for adjusting the input obtained by the node from a node of a previous layer; and update, for the plurality of base paths, values of the parameters associated with the nodes in the plurality of base paths based on the combined values.

\* \* \* \* \*